Patented Dec. 5, 1939

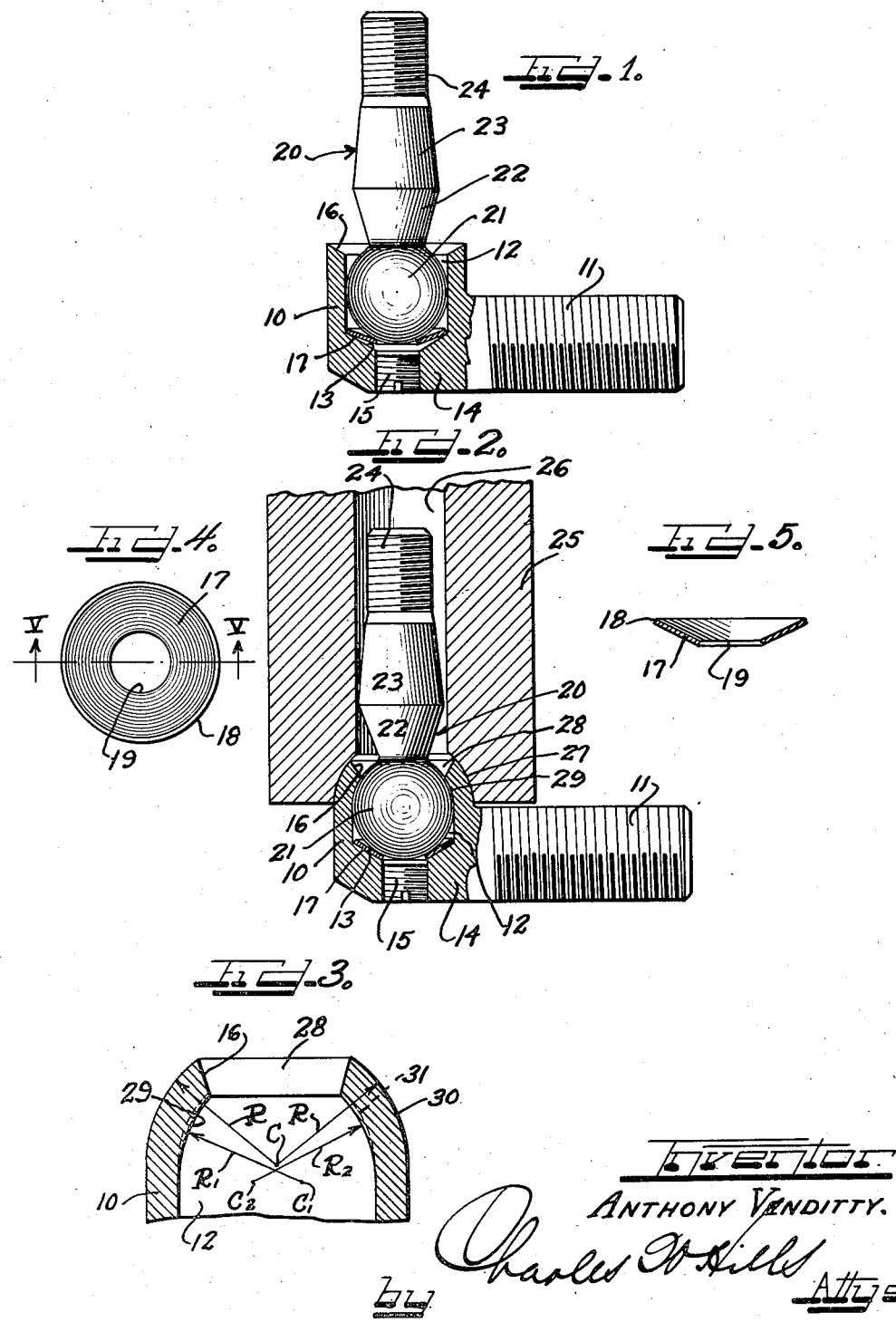

2,182,601

UNITED STATES PATENT OFFICE 2,182,601

BALL JOINT AND METHOD OF MAKING SAME

Anthony Venditty, Detroit, Mich., assignor to Thompson Products, Incorporated, Cleveland, Ohio, a corporation of Ohio Application October 7, 1937, Serial No. 167,722

9 Claims. (Cl. 29—152)

This invention relates to universal joints having stud members seated in one-piece housings.

More specifically the invention relates to a ball and socket tie rod joint in which the socket member is formed in one piece and has a converging toroidal bearing surface accommodating tilting and rotating movements of the ball end of the stud. The invention includes a method of making the joint by a single die pressing operation.

Ball and socket joints have heretofore been made by assembling a ball stud member in a previously formed housing having a segmental spherical bearing wall therein. This type of housing requires the use of a separate closure plug or disc to seal the ball stud in the housing.

According to this invention a one-piece housing is used having an integral bottom wall. The housing is provided with a cylindrical bore extending from one end thereof into spaced relation from the other end. A spring member is disposed in the bore for resting on the bottom wall of the housing and the ball end of a ball stud is then inserted in the bore of the housing on top of the spring member.

A die member having a segmental spherical seat is then disposed around the open end of the housing and forced thereagainst to deform the straight cylindrical outer walls of the housing into a segmental spherical shape conforming with the shape of the die seat. A restricted opening to the housing is thus formed having a diameter less than the great diameter of the ball head of the stud and the stud is thus retained in the housing.

Since the cylindrical side walls of the housing are of uniform thickness and since the deforming of a cylindrical member into a segmental spherical shape creates an excess of metal, the side walls of the housing gradually thicken, dependent upon the degree of deformation to form a converging toroidal bearing surface on the inner face thereof.

The spring member urges the ball end of the stud against this toroidal surface and the ball stud is thus retained in the housing and held in tiltable and rotatable relation on the converging toroidal bearing surface.

The invention avoids the necessity for closure plates and makes possible the formation of the ball stud seating surface during assembly of the ball stud in the socket.

It is then an object of this invention to provide universal joints having one-piece sealed socket members.

A further object of this invention is to provide a ball and socket joint in which the socket has a bottom wall portion integral therewith.

A further object of this invention is to provide tie rod joints including one-piece sealed sockets.

A further object of this invention is to form the seating surface in a socket for a ball stud after assembly of the ball end of the stud in the socket.

A further object of this invention is to utilize a one-piece housing member having a cylindrical bore or recess therein closed by an integral bottom wall portion and to deform the side walls of the housing by a stamping operation to create a converging bearing surface in the housing for a stud member after the stud member has been inserted in the housing.

Other and further objects of this invention will become apparent to those skilled in the art from the following detailed description of the annexed sheet of drawings which discloses a preferred embodiment of the invention.

On the drawing:

Figure 1 is a side elevational view of a ball and socket assembly according to this invention prior to the stamping or deforming operation, with parts of the assembly broken away and shown in vertical cross section;

Figure 2 is a side elevational view of the ball and socket assembly shown in Figure 1, after the stamping operation, with the stamping die and parts of the assembly shown in vertical cross section;

Figure 3 is a fragmentary cross-sectional view of a portion of the socket for the assembly illustrating the manner in which a toroidal bearing surface is formed in the socket;

Figure 4 is a plan view of a conical spring washer used in the assembly; and

Figure 5 is a vertical cross-sectional view taken along the line V—V of Figure 4.

As shown on the drawing:

In Figure 1, the reference numeral 10 designates a cylindrical housing having a threaded shank portion 11 extending laterally therefrom. The cylindrical housing 10 has a cylindrical bore 12 extending from the top thereof into spaced relation from the bottom. The bottom of the bore 12 tapers inwardly toward the central portion of the housing to provide a frusto-conical sloping wall 13. The housing 10 thus has a solid bottom wall 14 integral therewith.

A grease plug 15 may be threaded through the central portion of the bottom wall 14. The plug 15 can be removed for insertion of lubricant into the housing 10 or can be replaced with a lubricant fitting if desired.

The top of the cylindrical wall of the housing 10 may be beveled as at 16 for a purpose to be hereinafter described.

In assembling a ball joint according to this invention in the housing 10, a dished or frustoconical spring washer 17 is disposed in the bore 12. The washer 17 has an outer diameter less than the diameter of the bore and drops to the bottom of the bore 12 where its outer rim rests on the tapered wall 13 at the bottom of the bore. As shown in Figure 1, the washer 17 is normally flatter than the sloping wall 13 of the housing so that all but the outer rim of the washer is spaced from the wall 13.

As best shown in Figures 4 and 5, the washer 17 has a circular outer periphery 18 and a circular inner periphery 19. The washer is made of spring metal and it is adapted to be depressed from its normally slightly tapered or dished shape. However, when thus depressed, the washer will tend to spring back to its normal shape.

A ball stud 20 having a ball end 21, a tapered neck portion 22, an oppositely tapered eye receiving portion 23 and a cylindrical threaded end 24 has the ball end 21 thereof disposed in the bore 12 of the housing 10 on top of the washer 17.

The thus assembled parts are then inserted under a die 25 as shown in Figure 2. The die 25 has an axial bore 26 extending therethrough for receiving freely therein the portions 22, 23 and 24 of the ball stud 20. The die 25 has a segmental spherical seat 27 formed in the bottom thereof converging toward the bore 26.

When the die 25 is forced downwardly on the housing 10 the segmental spherical seat 27 thereof deforms the cylindrical side walls of the housing to conform with the shape of the seat 27. The top portion of the cylindrical housing 10 is thus curved inwardly and the tapered end 16 of the side walls of the housing defines a restricted opening 28 giving entrance to the housing. Since the wall 16 was initially beveled the opening 28 tapers outwardly.

As shown in Figure 2, the deforming of the side walls of the housing 10 to conform with the shape of the die seat 27 forms a curved bearing surface 29 at the end of the bore 12 receiving the top portion of the ball member 21 thereagainst. The ball member itself is forced downwardly toward the bottom wall 14 of the housing to depress the spring washer 17 and seat the same on the sloping wall 13. The spring member being depressed from its normal position thus urges the ball member into full seating relation with the bearing surface 29.

As best shown in Figure 3, when the cylindrical housing member having the cylindrical bore 12 therein, as shown in Figure 1, has the top portion thereof deformed by the seat of the die 25, the outer surface 30 of the side walls of the housing will be segmental spherical in shape and will conform identically with the segmental spherical seat 27 of the die. However, when a cylindrical member is deformed into a spherical shape, an excess of material is created. Therefore if the side walls of the housing 10 are initially of uniform thickness, the inner surface 29 of the deformed walls will be toroidal in shape instead of segmental spherical as shown at 31. The excess metal renders the side walls progressively thicker as the amount of deformation from the cylindrical increases, and the bearing surface 29 is therefore actually a torus instead of a segment of a sphere 31.

The outer surface 30 of the side walls of the housing 10 has a radius R about a center C positioned at the center of the ball end 21 of the stud. However the toroidal bearing surface 29 has radii $R^1$ and $R^2$ struck from centers $C^1$ and $C^2$ beneath the center C. This is highly desirable in universal joint constructions wherein a spherical member is seated on a curved socket wall for relative tilting and rotating movement since it provides a wider tolerance from exact fitting without interfering with the operation of the joint. If the bearing surface 29 were segmental spherical in shape it would have to be accurately formed within narrow limits to provide a good seat for the ball 21. However, the toroidal surface 29 receives only an area of the ball 21 thereon and the dimensions of the toroidal surface can vary while still providing a good seat for a portion of the ball. Furthermore during operation of the joint the ball end 21 can form its own bearing seat on the bearing surface 29.

I am aware that many changes may be made and numerous details of construction may be varied through a wide range without departing from the principles of this invention, and I, therefore, do not purpose limiting the patent hereon otherwise than necessitated by the prior art.

I claim as my invention:

1. A ball and socket joint comprising a one-piece housing having a lateral shank portion extending therefrom and an open topped chamber therein closed at the bottom with a bottom wall integral with the housing, said chamber having the top portion thereof curved inwardly to define a restricted opening giving entrance thereto and a toroidal bearing surface within the housing, a ball stud projecting freely through said restricted opening having a ball head in said chamber of larger diameter than said opening to prevent removal of the ball head, said ball head being seated on said toroidal bearing surface of the chamber in tiltable and rotatable relation thereto and spring means compressed between said ball end and the bottom wall of the housing to urge said ball end into proper seating relation with said curved portion of the chamber.

2. A ball and socket joint comprising a one-piece housing having inner side walls joined by a bottom wall integral with the housing, said side walls converging inwardly at the ends thereof spaced from the bottom wall to define a restricted opening giving entrance to the housing and a toroidal bearing surface accommodating tilting and rotating movements, a stud projecting freely through said opening having an enlarged ball end in the housing, said ball end being larger than the restricted opening to prevent removal from the housing, a conical spring washer compressed between said ball end and the bottom wall of the housing to urge the ball end against the converging portion of the side walls in tiltable and rotatable relation therewith and a grease plug threaded through said bottom wall for insertion of lubricant into the housing.

3. A ball and socket joint comprising a one-piece housing having an inner cylindrical side wall curved inwardly and thickened at one end thereof to provide a bearing surface accommodating tilting and rotating movements, said housing also having a tapered bottom wall integral with the housing, the edges of said curved wall portion defining a restricted annular opening giving entrance to the housing, a ball stud projecting through said opening and having a ball end in said housing, said ball end having the great diameter thereof larger than the opening and a conical spring washer seated on the tapered bottom wall of the housing and compressed between said wall and the ball end of the stud to urge the stud toward the housing opening and maintain the ball end seated on the curved bearing surface for relative tiltable and rotatable movement therewith.

4. A ball and socket joint comprising a one-piece housing having a cylindrical side wall curved inwardly at one end thereof and increasing in thickness toward said end to define a toroidal bearing surface in the housing and a segmental spherical surface on the outside of the housing, said housing having an integral bottom wall sloping downward from the inner side wall of the housing, the end of the inwardly curved side wall portion of the housing defining an annular opening giving entrance to the housing, a ball stud projecting freely through said opening having a ball head of larger diameter than said opening in the housing, a conical spring washer normally having a flatter contour than the tapered bottom wall of the housing compressed into full seating relation on said bottom wall for urging the ball head of the stud into seating relation on said toroidal bearing surface and means for supplying lubricant to the housing.

5. The method of making ball and socket joints which comprises fabricating a one-piece housing having a cylindrical recess therein, disposing a spring on the bottom wall of the recess, inserting the ball end of a ball stud in said recess and die pressing the side wall of the housing to converge said wall inwardly and increase the thickness of the wall toward the inner end thereof for defining a curved bearing surface in the recess retaining the ball end of the stud in the housing.

6. The method of making ball and socket joints which comprises fabricating a housing having a cylindrical bore extending from one end thereof into spaced relation from the other end thereof, counterboring the bottom of the bore to provide a tapered surface thereon, inserting a spring washer having a taper less than said counterbored surface, inserting the ball end of a ball stud in said housing and die pressing the open end of the housing with a die having a segmental spherical seat to curve the open end of the housing inwardly around the ball end of the stud for compressing the conical washer into full seating relation with the counterbore and to form a toroidally curved bearing surface for the ball end of the stud.

7. The method of making a ball and socket joint which comprises boring a cylindrical housing from one end thereof into spaced relation from the other end, disposing a spring in the bottom of the bore, inserting the ball end of a ball stud in the bore and die pressing the open end of the housing to thicken and curve said end inwardly and define a restricted opening giving entrance to the housing of smaller diameter than the ball end of the stud whereby the stud is retained in the housing and seated on the thus curved portion of the bore.

8. The method of assembling a ball and socket joint which comprises fabricating a cylindrical housing having a cylindrical recess extending from one end thereof into spaced relation from the other end, said recess being closed by a bottom wall integral with the housing, inserting a spring means in the bottom of the recess, disposing the ball end of a ball stud in the recess, forcing the segmental spherical seat of a die around the open end of the housing to converge said open end inwardly and deform the outer wall of the housing into a segmental spherical shape, said die pressing operation converting a portion of the inner wall of the housing into a toroidal shape to form a bearing surface accommodating tilting and rotating movements of the ball stud.

9. A universal joint comprising a one-piece metal housing having an inner cylindrical side wall joined by an integral bottom wall, said housing having an integral shank extending laterally therefrom, said side wall converging inwardly at the end thereof spaced from the bottom wall to define a restricted opening giving entrance to the housing as well as a converging bearing surface accommodating tilting and rotating movement, a metal stud projecting freely through said opening having an enlarged head portion in the housing seated in tiltable and rotatable relation directly on said converging bearing surface in metal-to-metal contact therewith, said head portion being larger than said opening to prevent removal from the housing and resilient means compressed between the head portion and the bottom wall to urge the head against the converging bearing surface.

ANTHONY VENDITTY.